(12) United States Patent
Liao et al.

(10) Patent No.: US 7,876,329 B2
(45) Date of Patent: Jan. 25, 2011

(54) SYSTEMS AND METHODS FOR MANAGING TEXTURE DATA IN A COMPUTER

(75) Inventors: Fred Liao, San Jose, CA (US); Yijung Su, Alviso, CA (US); Yiping Chen, San Jose, CA (US); Mark Zheng, Fremont, CA (US)

(73) Assignee: Via Technologies, Inc., Taipei (TW)

( * ) Notice: Subject to any disclaimer, the term of this patent is extended or adjusted under 35 U.S.C. 154(b) by 733 days.

(21) Appl. No.: 11/852,354

(22) Filed: Sep. 10, 2007

(65) Prior Publication Data

US 2009/0066714 A1 Mar. 12, 2009

(51) Int. Cl.
G06T 1/20 (2006.01)
G06T 15/00 (2006.01)
G06T 11/40 (2006.01)
G09G 5/36 (2006.01)
G06F 21/00 (2006.01)
G06F 13/00 (2006.01)
G06F 9/34 (2006.01)

(52) U.S. Cl. .................. 345/582; 345/545; 345/552; 345/522; 345/506; 711/6; 711/100; 711/125; 711/203

(58) Field of Classification Search .......... 345/418, 345/426, 428, 581–582, 520, 501–503, 505–506, 345/522, 536, 545, 552; 711/6, 100, 113, 711/125, 202–203

See application file for complete search history.

(56) References Cited

U.S. PATENT DOCUMENTS

| | | | | |
|---|---|---|---|---|
| 6,654,021 B2 * | 11/2003 | Wasserman et al. | ......... | 345/535 |
| 6,741,258 B1 * | 5/2004 | Peck et al. | .................... | 345/568 |
| 2002/0093507 A1 * | 7/2002 | Olarig | ......................... | 345/568 |
| 2003/0137528 A1 * | 7/2003 | Wasserman et al. | ......... | 345/700 |
| 2007/0182750 A1 * | 8/2007 | Teruyama et al. | ........... | 345/558 |
| 2009/0128575 A1 * | 5/2009 | Liao et al. | ................... | 345/552 |
| 2009/0278845 A1 * | 11/2009 | Kato et al. | .................. | 345/420 |

* cited by examiner

*Primary Examiner*—Wesner Sajous
(74) *Attorney, Agent, or Firm*—Thomas, Kayden, Horstemeyer & Risley, LLP

(57) ABSTRACT

Provided are methods for managing texture data in Graphics Processing Units (GPUs). The methods include receiving, into an arbiter, a preload request configured to request processing of texture data in advance of shader processing and receiving, into the arbiter, a dependent read request configured to request processing of texture data after shader processing. The methods also include receiving, into the arbiter, a capacity signal from a texture buffer and determining, utilizing the virtual buffer capacity signal, a selected request corresponding which of the preload request and the dependent read request is granted. The methods further include processing, in a texture processor, texture data corresponding to the selected request.

19 Claims, 13 Drawing Sheets

SYSTEMS AND METHODS FOR MANAGING TEXTURE DATA IN A COMPUTER

CROSS-REFERENCE TO RELATED APPLICATIONS

This application is related to co-pending application Ser. No. 11/943,071 filed Nov. 20, 2007.

TECHNICAL FIELD

The present disclosure is generally related to computer processing graphics data and, more particularly, is related to systems and methods for managing texture data in computer by using a shared texture engine.

BACKGROUND

In modern computer graphics, texture processing can include many different types of texture mapping techniques including cubic mapping, mipmapping, and anisotropic mapping among others. The complexity and volume of arithmetic and logical operations utilized to perform texture processing necessitate the use of dedicated circuits in addition to those utilized in other graphics processing operations. Accordingly, these dedicated texture processing circuits can include a significant percentage of the hardware gates that make up a graphics processing unit.

In addition to texture processing, graphics processors also include logic to perform several types of shader program execution operations. For example, shader programs can be performed by vertex shaders, geometry shaders, and pixel shader processors (further shaders). In general, the shaders may utilize texture mapping services from the texture processing hardware at various stages of shader processing. For example, some shader programs (operations) can benefit from the efficiency improvement gained by preloading, also referred to as prefetching, texture data before shader program execution.

Preload texturing can be especially beneficial in pixel shading operations where the texture processing requirements can be reliably predicted before shading operations. It may be considered a static texture processing. Alternatively, other shader operations require the texture data to be fetched and processed during the shader program execution for a particular graphic stream element has commenced. It may be considered as dynamic texture processing. Texture processing that is requested by the shader program is referred to as dependent read texturing and may be utilized more frequently in vertex and geometry shader operations. Since providing exclusive texture processing hardware to address each of the preload and dependent read texturing requirements creates an unwanted level of redundancy and can be costly in terms of processor hardware, methods and systems for sharing texture processing hardware are desired. Thus, a heretofore-unaddressed need exists in the industry for improved and optimized texture processing operations.

SUMMARY

Embodiments of the present disclosure provide a system for managing texture data in computer, comprising: a texture processor configured to process texture data in a graphics pipeline; a shader processing block configured to perform a shader operation on a graphics element in a graphics pipeline; an arbiter configured to select between a plurality of requests for service of the texture processor; and a texture buffer configured to receive processed texture data from the texture processor.

Embodiment of the present disclosure can also be viewed as providing methods for managing texture data. In this regard, one embodiment of such a method, among others, can be broadly summarized by the following steps: receiving, into an arbiter, a preload request configured to request processing of texture data in advance of shader processing; receiving, into the arbiter, a dependent read request configured to request processing of texture data after shader processing; receiving, into the arbiter, a capacity signal from a texture buffer; determining, utilizing the capacity signal, a selected request corresponding which of the preload request and the dependent read request is granted; and processing, in a texture processor, texture data corresponding to the selected request.

Embodiments of the present disclosure provide a system for managing texture data, comprising: an arbiter configured to select between a dependent read request and a preload request for services of a texture processor; a texture buffer configured to receive processed texture data corresponding to the preload request; and a virtual buffer, sized as a function of the texture buffer, configured to send a capacity signal to the arbiter as an input.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
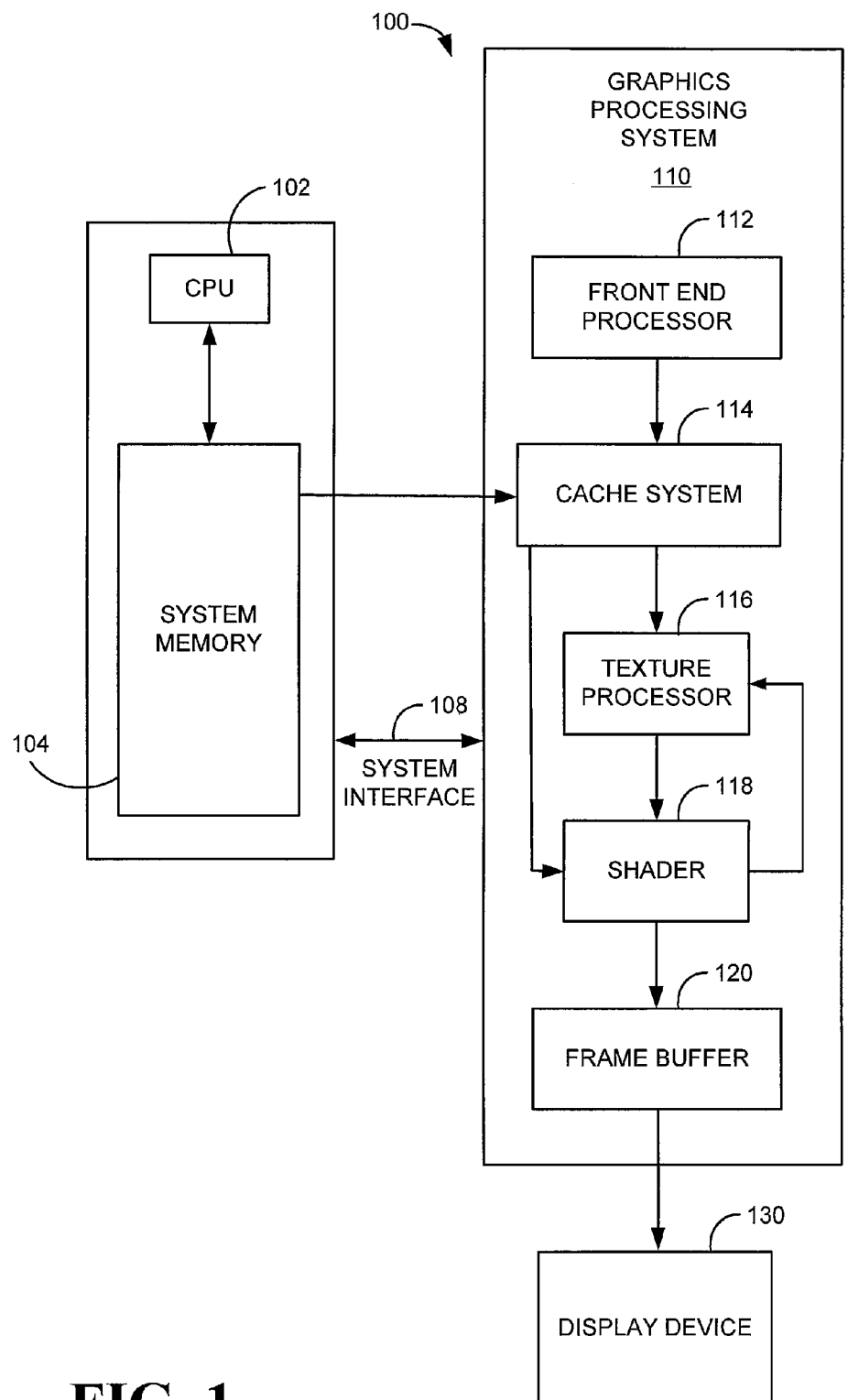
FIG. 1 is a block diagram illustrating an exemplary computer system that utilizes the systems and methods disclosed herein.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Reference is now made to FIG. 1, which is a block diagram illustrating an exemplary computer system that utilizes the systems and methods disclosed herein. The computer system 100 includes a CPU 102, a system memory 104, and a graphics processing system 110. A CPU 102 performs various functions, including determining information, such as, for example, a view point location allowing for the generation of graphic displays. The system memory 104 stores a variety of a data, including graphic display data such as multiple texture maps and texture descriptors. The graphics processing system 110, based on information determined by the CPU 102 and the data stored in the system memory 104, generates display data for a display device 130, such as, for example, a monitor.

The CPU 102 provides requests to the graphics processing system 110 over a system interface 108, including requests to process and display graphics information. Graphics requests from the CPU 102 are received by the graphics processing system 110 and provided to a front end processor 112. The front end processor 112 generates a pixel string containing pixel coordinates concomitant to the display device 130. Information relating to the pixel coordinates generated by the front end processor 112 is provided to a texture processor 116 utilizing a cache system 114. The cache system 114 provides short-term data storage for the data necessary to perform the texture processing and the shader operations. The data can be stored based on operations where the data is preloaded in anticipation of new requirements of future operations within the texture processor 116, or the data can be retrieved from the system memory 104 into the cache system 114 based on specific requests from the texture processor 116. Shader 118 may also request texture data during shader program execution.

In addition to storing data for the texture processor 116, the cache system 114 also stores data for the shader 118. Although referred to this figure in the singular, the shader 118 can include a vertex shader, a pixel shader, a geometry shader and/or other component. Further, the shader 118 can include multiple shader execution units configured to process a plurality of graphics threads in parallel. The shader 118 may perform various transformations on the graphics data. In this regard, the data may be transformed from world coordinates to model view coordinates, to projection coordinates, and ultimately into screen coordinates. The functional processing performed by the shader 116 is known and need not be described further herein. Thereafter, the graphics data may be passed on to the frame buffer 120, which is used to generate a display on a display device 130. One should note that computer system 100 can also facilitate the processing of prefetch texture requests and/or dependent texture reads, as discussed in more detail below.

Figure 2A:
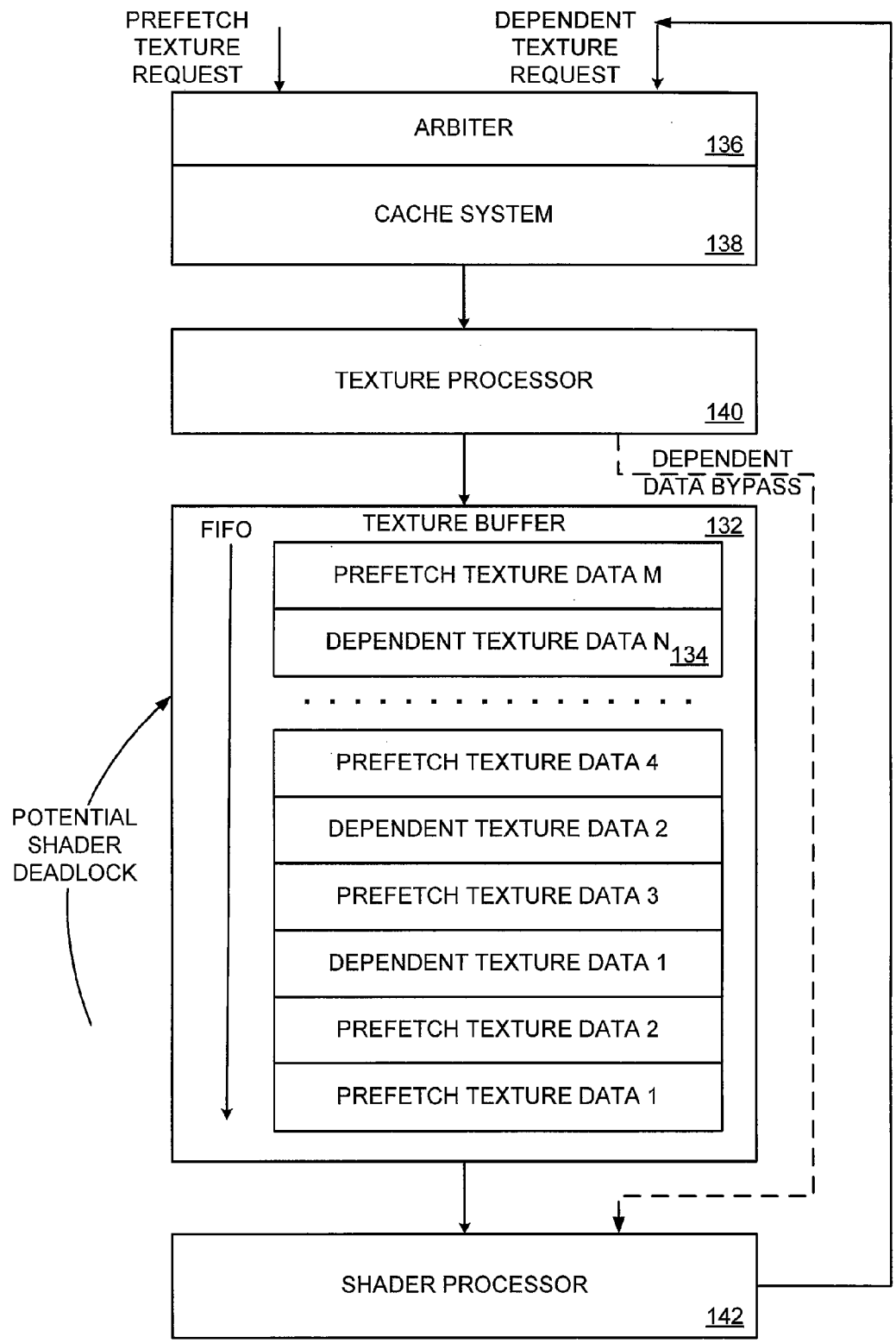
FIG. 2A is a block diagram illustrating a texture data managing system implementation with a single channel for both preload and dependent texture requests.

Reference is now made to FIG. 2A, which is a block diagram illustrating a texture data managing system implementation with a single channel for both preload and dependent texture requests. The texture buffer 132 contains interleaved texture data and, in some cases, may cause a deadlock when prefetch data cannot go into the shader. This is because the texture buffer 132 may be busy waiting for requested dependent texture data 134 that may not be able to go around prefetch data in a texture FIFO-type buffer. As such, a dependent data bypass may be desired.

Also included in the nonlimiting example of FIG. 2A is an arbiter 136, which may be configured to receive prefetch texture requests and dependent texture requests. Coupled to the arbiter 136 is a cache system 138 (similar to cache system 114 from FIG. 1), which may be configured to store at least a portion of the data sent to the arbiter 136. A texture processor 140 (similar to texture processor 116 from FIG. 1), may be coupled to cache system 138 and may be configured to process at least a portion of the data stored in cache system 138. The data may be sent to the texture buffer 132 (where a deadlock may occur) and onto shader processor 142.

Figure 2B:
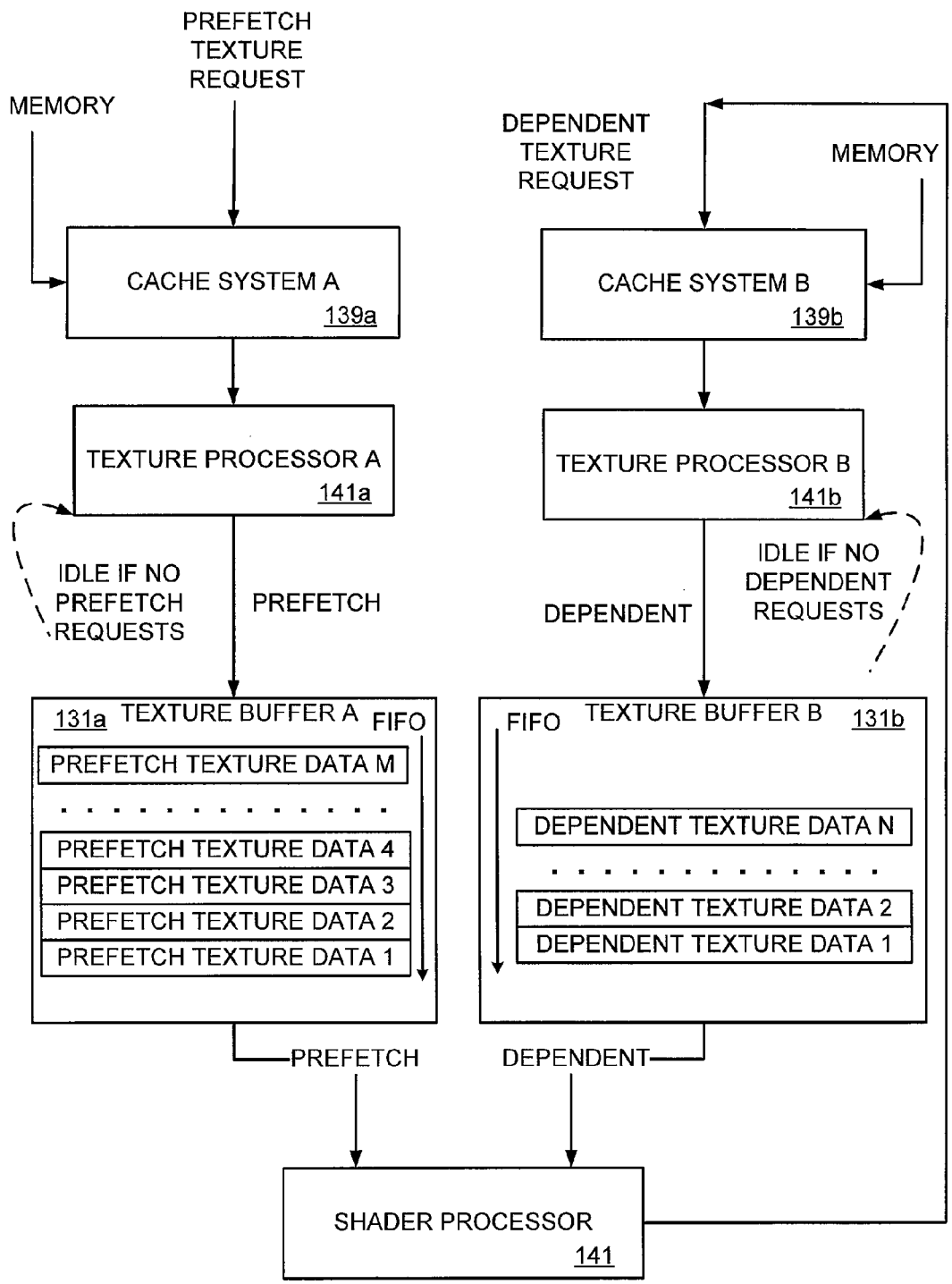
FIG. 2B is a block diagram illustrating implementation of two independent texture channels for managing prefetch and dependent texture data.

Reference is now made to FIG. 2B, which is a block diagram illustrating implementation of two independent texture channels for managing prefetch and dependent texture data. Such structure may avoid problems with potential deadlocks as described in FIG. 2A. At the same time, two independent texture managing systems may introduce inefficiencies and disbalance in texture buffer use, in the case of uneven rate of prefetch and dependent texture data requests.

More specifically, as illustrated in FIG. 2B, cache system A 139a may be configured to receive data from memory, as well as prefetch texture request data. Cache system A 139a is coupled to texture processor A 141a, which may be configured to receive data from cache system A 139a. Texture processor A 141a is coupled to texture buffer A 131a, which can buffer the received prefetch data in a FIFO configuration and send data to shader processor 141.

Similarly, cache system B 139b can be configured to receive data from memory, as well as dependent texture requests. Cache system B 139b is coupled to texture processor B 141b and can be configured to send stored data to texture processor B 141b. Texture processor B 141b is coupled to texture buffer B 131b, which may be configured to buffer dependent texture data in a FIFO configuration. Texture buffer B 131b is coupled to shader processor 141. Shader processor 141 can be configured to send data back to cache system B 139b.

Figure 2C:
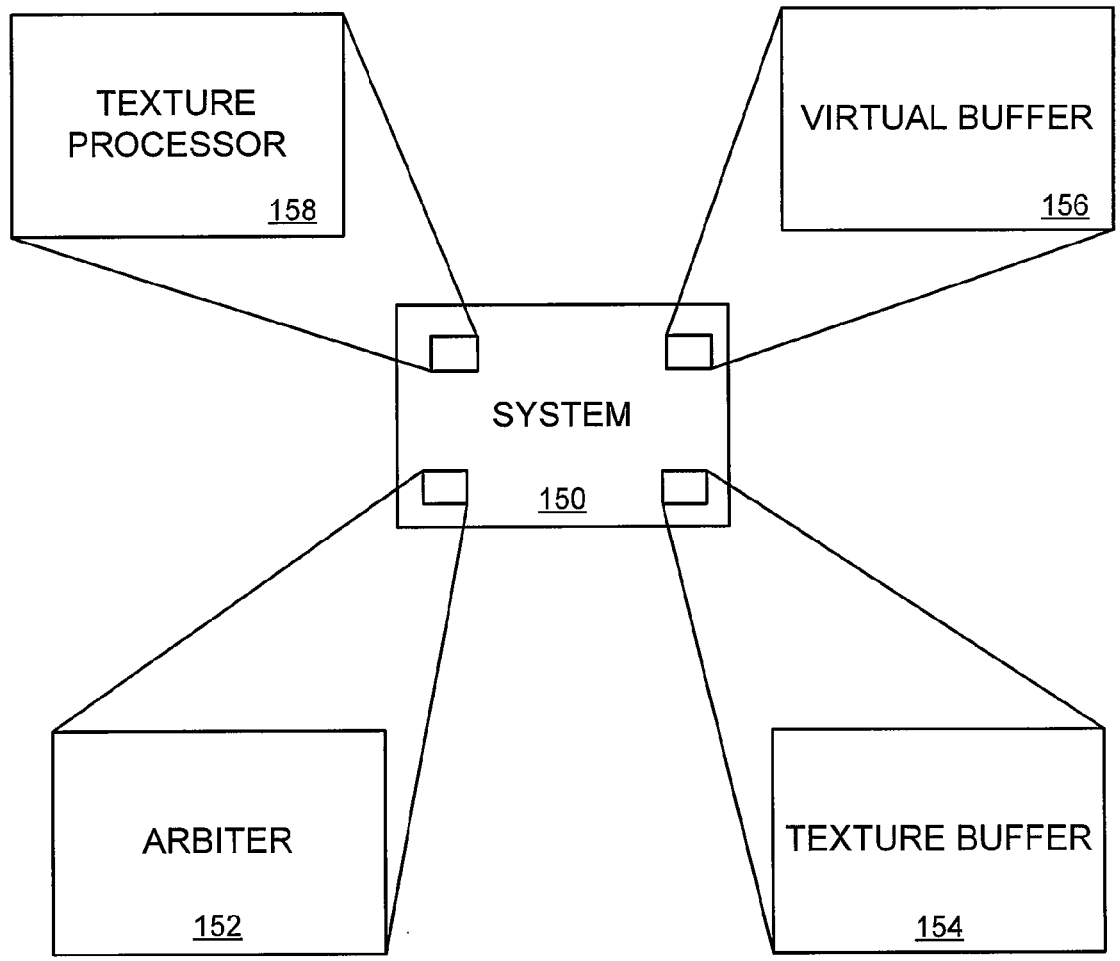
FIG. 2C is a block diagram illustrating an embodiment of a system for managing texture data.

Reference is now made to FIG. 2C, which is a block diagram illustrating an embodiment of a system for managing texture data, which may resolve the above discussed issues. The system 150 includes an arbiter 152 that is configured to select between a dependent read request and a preload request for services of a texture processor 158. The texture processor 158 performs texture related calculations such as texture filter operations, including but not limited to, bilinear filtering, trilinear filtering, and anisotropic filtering. A texture buffer 154 is utilized to temporarily store texture data before they may be delivered to the shader. Moreover, the virtual buffer is further configured corresponding to which of the plurality of shader processing block types is utilized. The texture data can include, for example, data for performing texture processing on a particular graphics element. In this context, a graphics element can be, for example, a pixel, a vertex, or a geometric primitive.

The system 150 also includes a virtual buffer 156, which has a capacity that is a function of and typically greater than that of the texture buffer 154. For example, the virtual buffer 156 can be set by a system driver to have a capacity of ten percent (10%) greater than that of the texture buffer 154. In this manner, the system 150 can be configured to function in an aggressive or conservative mode by varying the relationship between the virtual buffer 156 and the texture buffer 154. For example, where the system 150 is to be operated in a conservative mode, the virtual buffer 156 may be set to include the same capacity as the texture buffer 154. Utilizing the capacity of the virtual buffer 156, the arbiter 152 determines additional preloaded data can be accommodated to determine which of the preload data requests or the dependent read data request is granted. While granting preload requests as early as possible results in better performance, where the virtual buffer 156 is sized at the same capacity as the texture buffer 154, the system 150 will operate more conservatively and not stall due to lack of capacity for subsequently processed preload data.

Figure 3A:
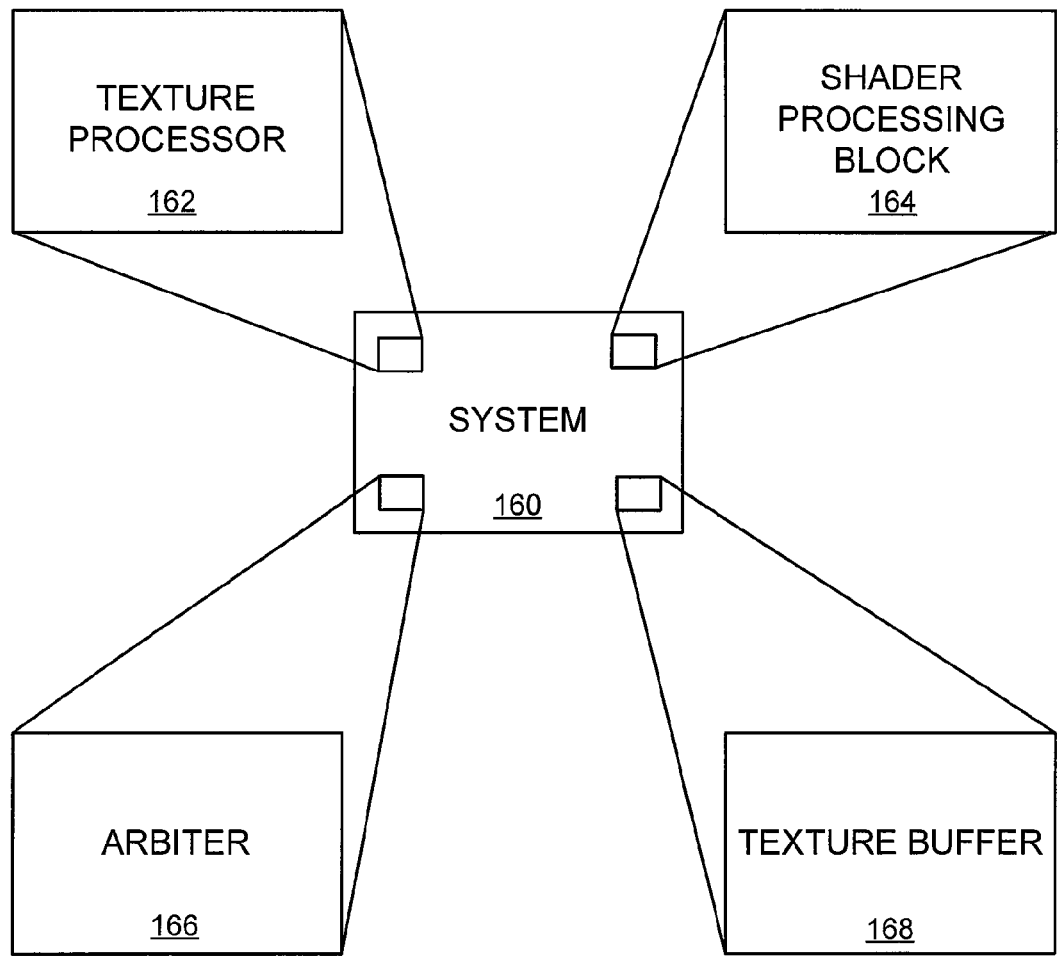
FIG. 3A is a block diagram illustrating an alternative embodiment of a system for managing texture data.

Reference is now made to FIG. 3A, which is a block diagram illustrating an alternative embodiment of a system for managing texture data. The system 160 includes a texture processor 162 configured to perform texture processing operations, such as texture filtering. The system 160 also includes a shader processing block 164 configured to perform shading operations for the computer graphics element. The shader processing block 164 can be configured, for example, as a pixel shader, a vertex shader, and/or a geometry shader, depending on which of the graphics elements is being processed. In some cases, the system 160 can process preloaded data in the texture processor 162 to further improve the performance of the system 160. In this manner, the texture processing on the preloaded data is performed before shader processing is performed on the same graphics element. Alternatively, texture processing may be desired on graphics elements while shader processing operations have been performed. In this circumstance, a request for texture service made of the texture processor 162 is a request for a dependent (dynamic) read operation. In the circumstance where both a preload request and a dependent read request are made, the arbiter 166 determines which of these requests are granted. Where the arbiter 166 grants a preload request, the preload texture data is processed in the texture processor 162 and the result is passed to the texture buffer 168 for subsequent availability to the shader processing block 164. Alternatively, when the arbiter 166 grants a dependent read request, the processed dependent read texture data is transmitted back to the shader processing block 164. The shader processing block 164 can include, for example, a shader buffer for receiving the processed dependent read texture data. The shader buffer may also be utilized to receive and store data that is unrelated to texture processing.

Figure 3B:
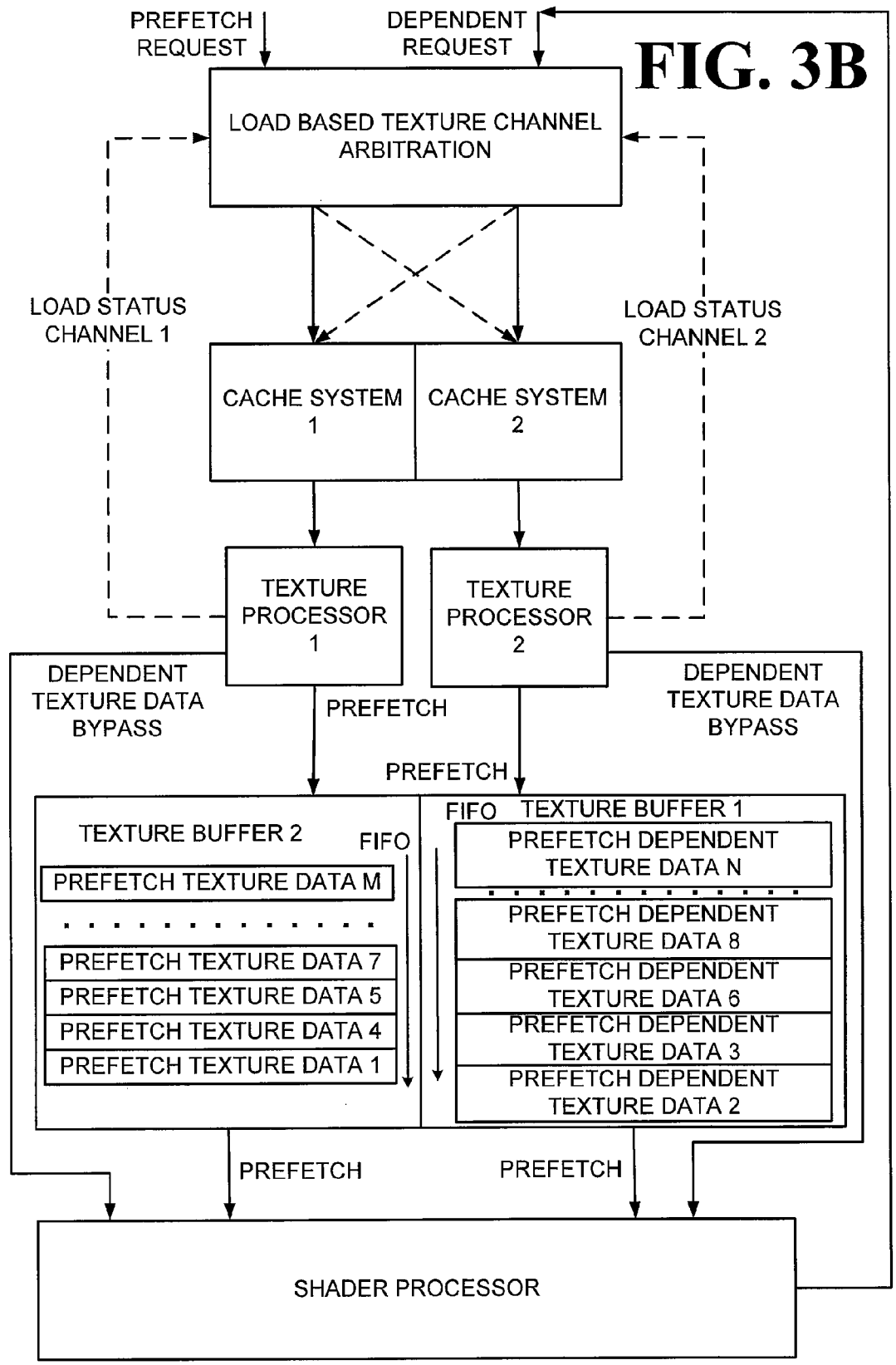
FIG. 3B is a block diagram illustrating texture data flow in the system depicted in FIG. 3A.

Reference is now made to FIG. 3B, which is a block diagram illustrating texture data flow in the system depicted in FIG. 3A. Load-based texture channel arbitration may be completed for all requests and one or more request may be routed to the channel that has a relatively minimal load on backend texture buffers. Texture buffers may be kept balanced and prefetch texture requests may go through at a substantially even rate. A shader processor may receive this data and keep balanced processing of graphics elements requesting texture data.

Figure 4:
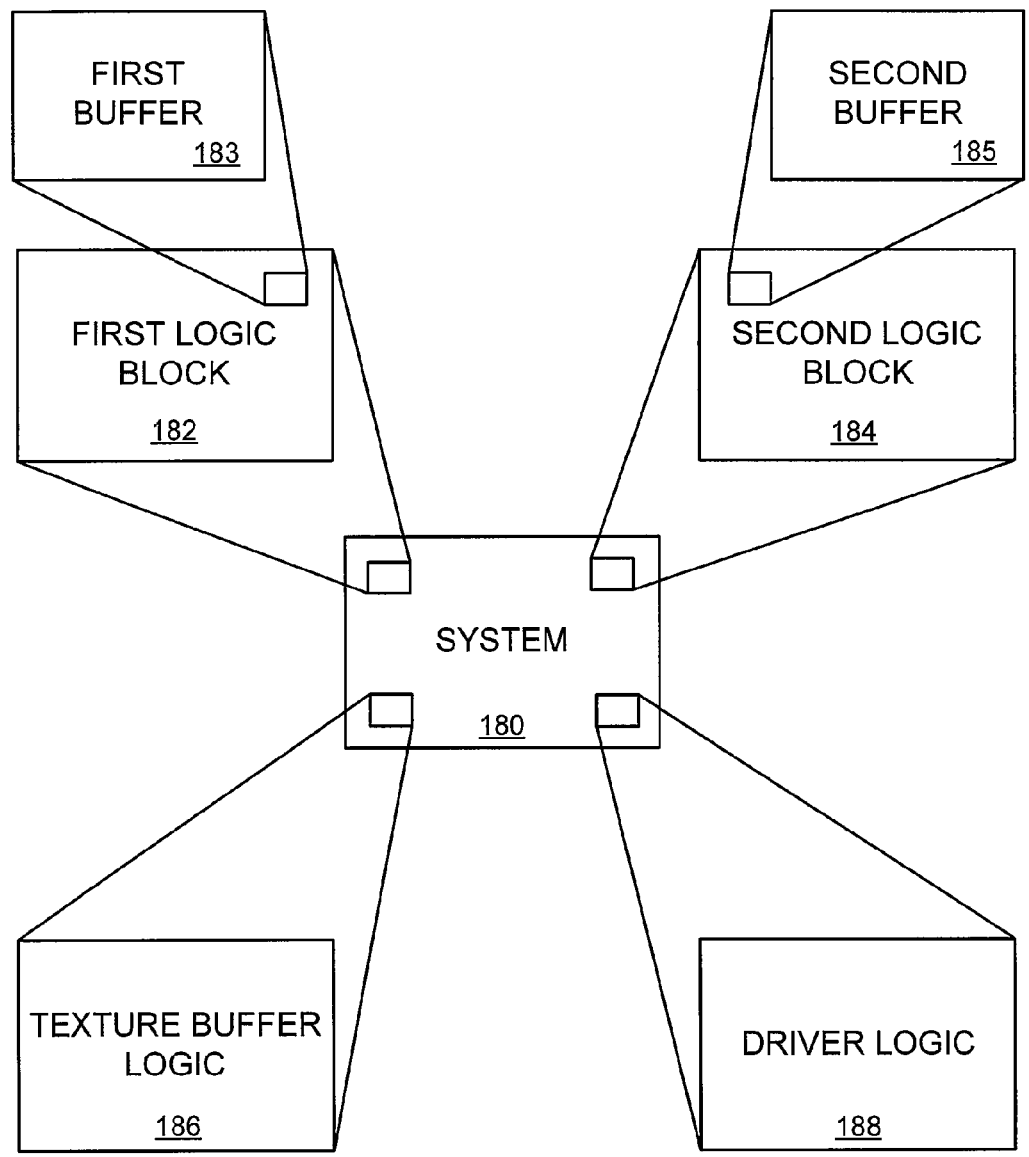
FIG. 4 is a block diagram illustrating another alternative embodiment of a system for managing texture data.

Reference is now made to FIG. 4, which is a block diagram illustrating another alternative embodiment of a system for managing texture data. A system 180 includes driver logic 188 configured to provide control commands to graphics pipeline components. The system 180 further includes a first logic block 182, where the first logic block 182 includes a first buffer 183. The first logic block 182 can be configured to perform texture processing and the first buffer 183 can be configured to receive a portion of preloaded texture data values. The system 180 further includes a second logic block 184, which includes a second buffer 185. The second logic block 184 can be configured to perform shader operations on the pixel, vertex, or geometric level of abstraction. The second buffer 185 is also configured to receive a portion of preloaded texture data values. The capacities of the first buffer 183 and a portion of the second buffer 185 can be combined to create a virtual buffer. The capacity utilization of the virtual buffer can be used as one input into an arbiter that is configured to decide which of the preload or dependent read requests to grant. The system 180 also includes a texture buffer logic 186 that is configured to manage texture data corresponding to multiple contexts. For example, the texture buffer logic 186 can be utilized to coordinate the communications between the first buffer 183 and the second buffer 185. Additionally, the texture buffer logic 186 can be utilized to determine the functional relationship between the first buffer 183, the second buffer 185, and the virtual buffer.

Figure 5:
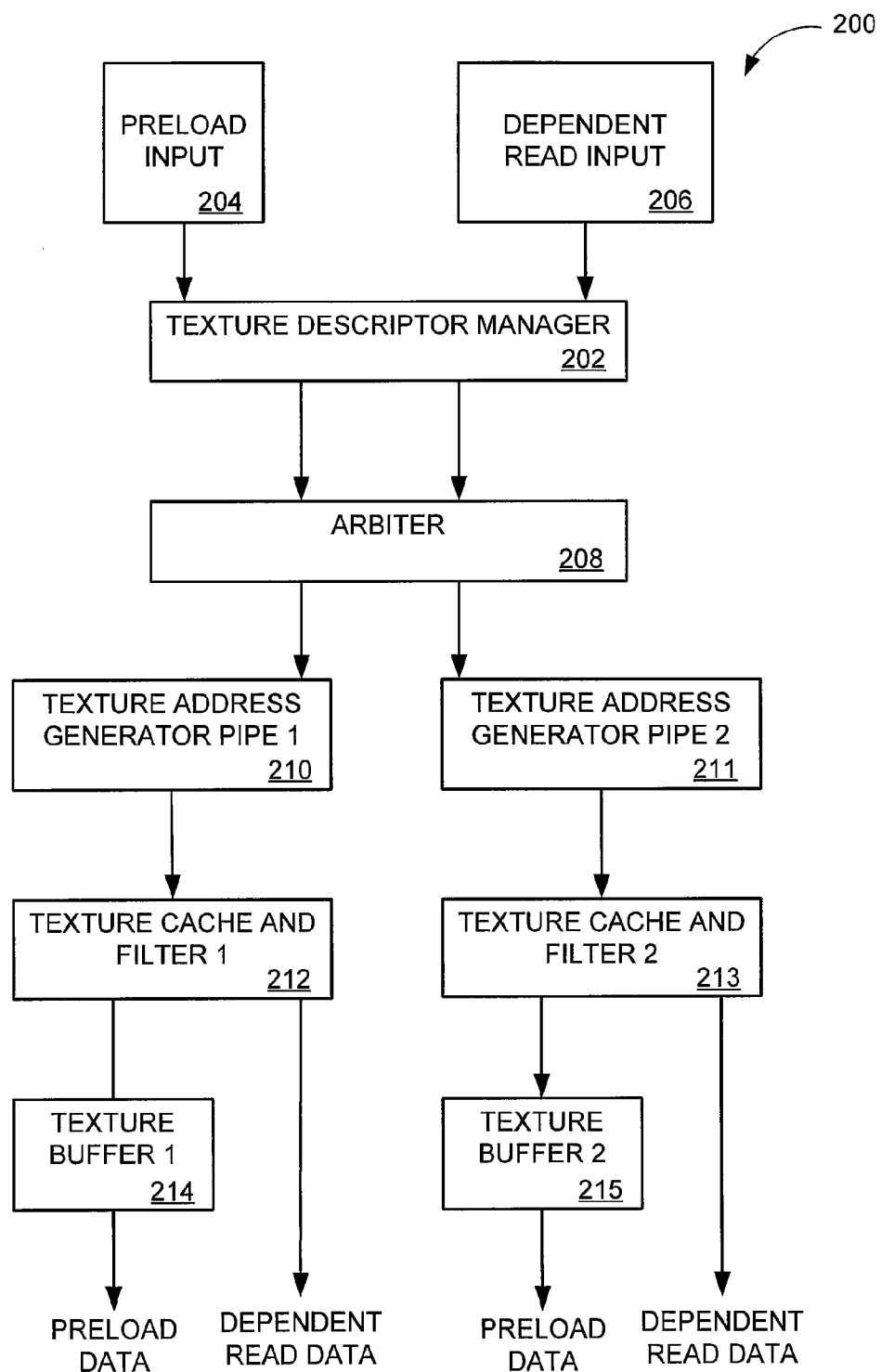
FIG. 5 is a block diagram of a top level illustration of a system for managing texture data.

Reference is now made to FIG. 5, which is a block diagram of a top level illustration of a system for managing texture data. The system 200 receives texture requests for a preload input 204 or a dependent read input 206. The request for the preload input 204 comes from the system driver logic and the request for the dependent read input 206 is made by the shader. A texture descriptor manager 202 receives the texture data associated with the preload input 204 and the dependent read input 206. When the data from either of the two sources is complete, a texture request is sent to the arbiter 208. An arbiter 208 may select either the dependent read request and/or the preload data request when that data is available from the texture descriptor manager 202. The texture data corresponding to the selected request is then forwarded to texture address generator pipelines 210, 211.

As illustrated, the system 200 of some embodiments includes multiple texture processing pipelines. The texture address generator pipelines 210, 211 can calculate a texture address using any one of a number of texture mapping techniques. The texture request data is then sent to texture cache and filters 212, 213 for a texture value calculation that results in the final texture color.

When the arbiter 208 grants the request corresponding to the preload input 204, the result of the texture processing is stored in the texture buffers 214, 215. Alternatively, where the texture request corresponding to the dependent read input 206 is granted by the arbiter 208, the result of the texture processing is stored in a buffer configured to support the shader stage, such as a pixel shader, a vertex shader, and/or a geometry shader.

Figure 6:
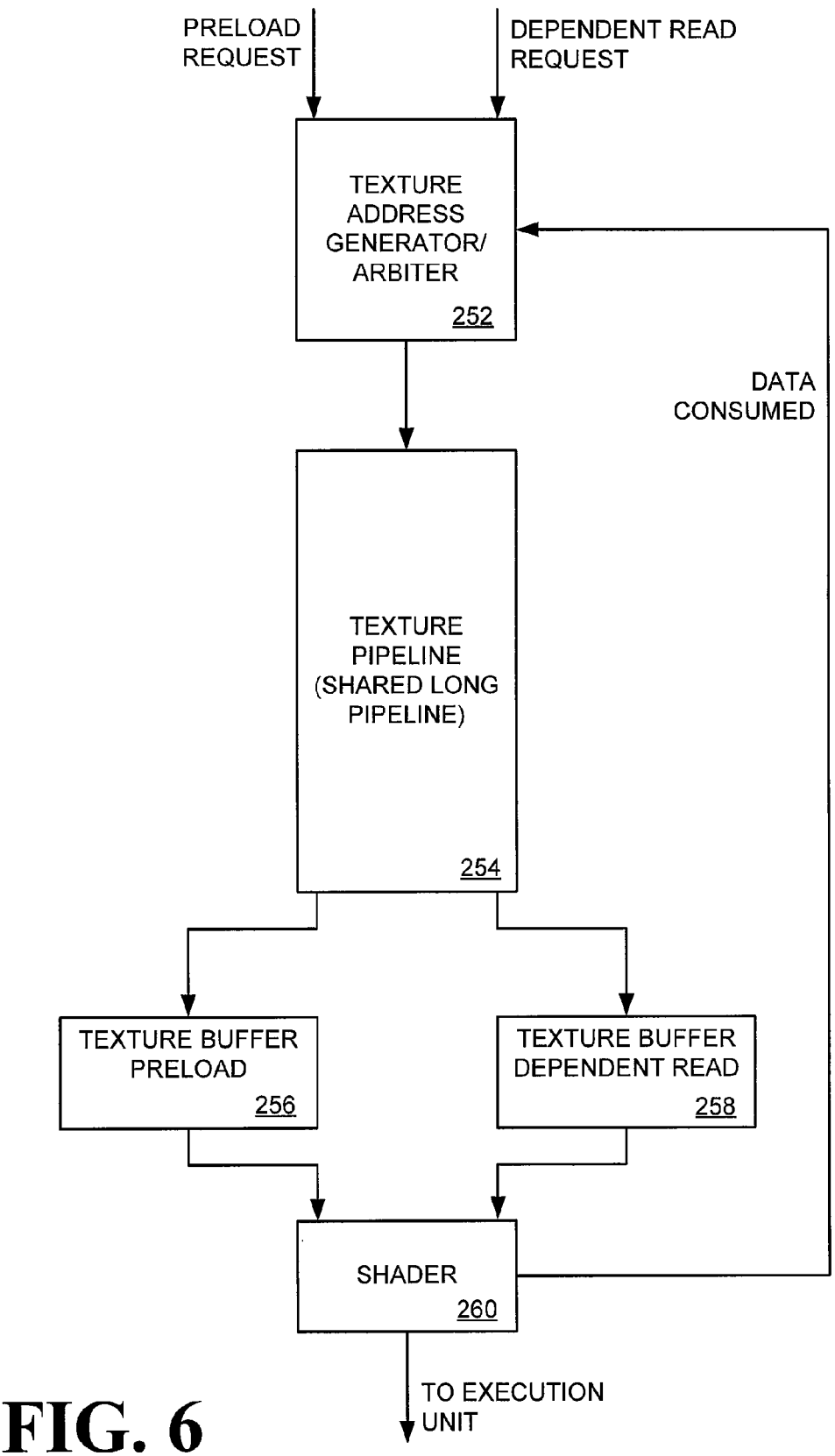
FIG. 6 is a block diagram illustrating an embodiment of an arbiter control loop.

Reference is now made to FIG. 6, which is a block diagram illustrating an embodiment of an arbiter control loop. The arbiter for the texture may be configured to facilitate balancing of requests from preload data and dependent read data. For example, if the preload request is scheduled too frequently, the shader will not be able to allocate enough resources to complete the existing threads within the shader processor. Alternatively, if the dependent read request is scheduled too frequently then an insufficient number of new threads are pipelined and significant delays due to latency will result. The texture address generator/arbiter 252 receives preload requests and dependent read requests and determines which of the requests to grant for texture service. A selected texture request is sent to the texture pipeline 254, which is a long shared pipeline utilized for performing texture filtering operations. The processed texture data is then stored in either the texture buffer preload 256 or the texture buffer dependent read 258 depending on the corresponding request granted. The texture buffer dependent read 258 may have significantly less capacity than the texture buffer preload 256 but may have a higher processing priority. To keep track of the available space in the texture buffer preload 256, the texture address generator/arbiter 252 includes an internal counter. Every time a preload request is granted and sent to the texture pipeline 254, the counter is decremented based on the size of the data that will be generated by the texture pipeline 254. Accordingly, when the shader 260 consumes the data in the texture buffer preload 256, it will send a corresponding signal to the texture address generator/arbiter 252 regarding the size of the consumed data. The counter within the texture address generator/arbiter 252 is then incremented. In this manner, the texture address generator/arbiter 252 can utilize the data regarding the available capacity of the texture buffer preload 256 to determine which of the preload or the dependent read requests to grant.

Figure 7:
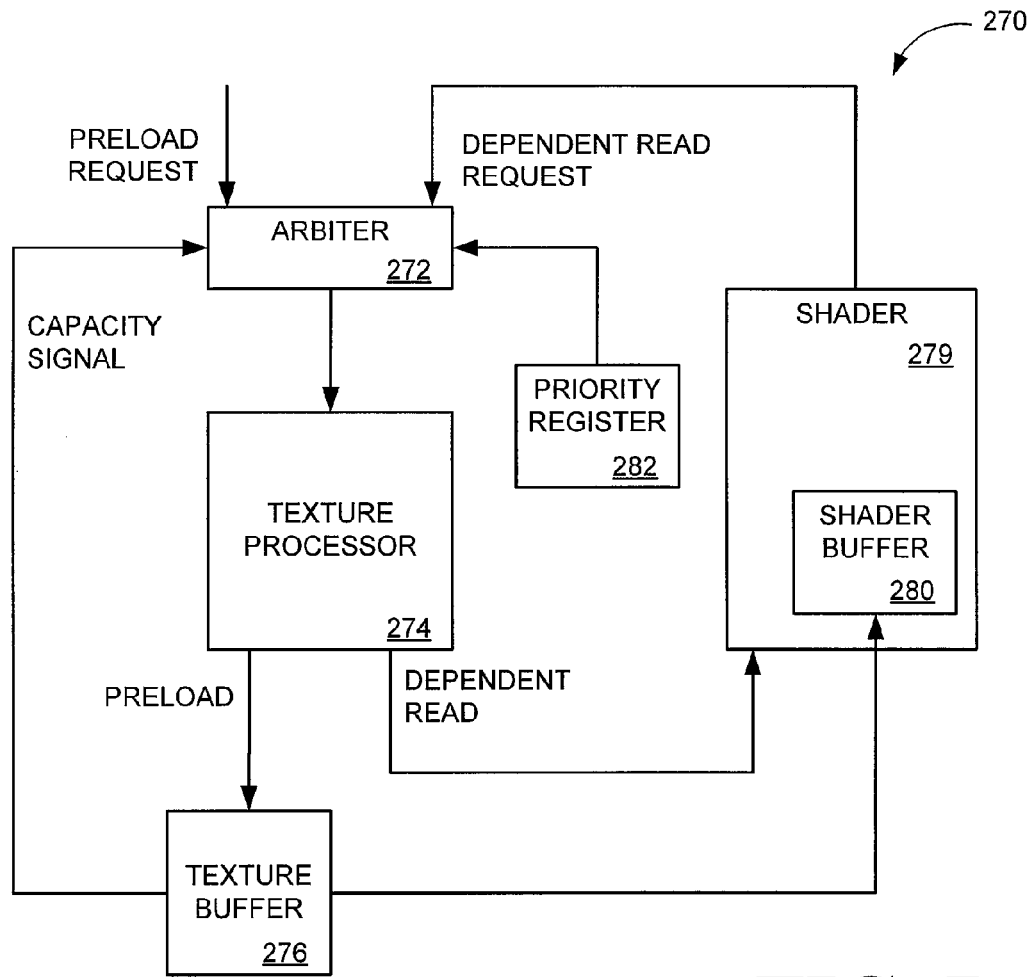
FIG. 7 is a block diagram illustrating an embodiment of an arbiter control loop.

Reference is now made to FIG. 7, which is a block diagram illustrating texture data flow in an embodiment of a system as disclosed herein. The system 270 includes an arbiter 272 configured to receive a preload request and a dependent read request. The preload request is a request to process texture data prior to shader processing for the same graphics element. The graphics element as disclosed herein can be, for example, a pixel, a vertex, or a geometrical shape. A dependent read request is a request for texture processing corresponding to a graphics element that is already undergone shader processing in a shader 279. The arbiter 272 can be configured to receive a capacity signal from a texture buffer 276. The capacity signal indicates the storage capacity available in the texture buffer 276. The texture buffer 276 receives a result of preloaded data processed in the texture processor 274. From the texture buffer 276, the process texture data is sent to the shader buffer 280. The shader buffer 280 is configured to receive and store data necessary for the shader 279 to perform shader operations. The shader buffer 280 can be partitioned such that a portion of the shader buffer 280 is configured to accommodate texture related data and the remaining portion is configured to accommodate data that is unrelated to texture processing. When the shader 279 requires additional texture processing, the dependent read request is made. Where the dependent read request is granted by the arbiter 272, the texture processor 274 processes the dependent read request and produces a result that is communicated directly to the shader 279. Depending on system conditions, a greater priority may be granted to either the preload requests or the dependent read request using a priority register 282. The priority register 282 can be utilized to store and communicate priority information to the arbiter 272.

Figure 8:
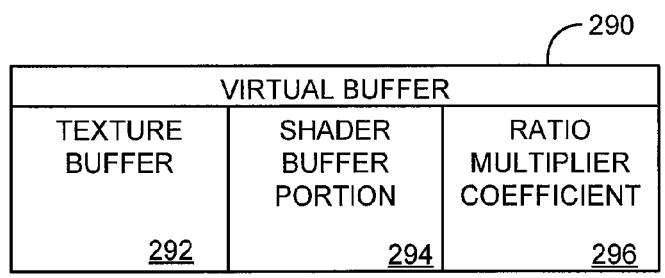
FIG. 8 is a block diagram illustrating an exemplary embodiment of a virtual buffer.

Since the efficiency of the system is increased by preloading data, the default state may grant the preload request so long as the texture buffer 276 has the capacity for additional data. A conservative approach would send a capacity signal from the texture buffer 276 to the arbiter 272 to grant the preload request when there is actual space. However, due to the latency between the arbiter 272 and the texture buffer 276, the buffer resources would not be fully utilized. In a more aggressive scheme, a virtual buffer is determined that can be larger than the texture buffer 276. The size of the virtual buffer can be determined using several factors. As shown in FIG. 8, which is a block diagram illustrating an exemplary embodiment of a virtual buffer, the virtual buffer 290 can be determined by the size of the texture buffer 292, the shader buffer portion 294, and a ratio multiplier coefficient 296. Where a more conservative approach is beneficial, the virtual buffer 290 can be set at the same capacity as the texture buffer 292. This can be done by setting the shader buffer portion size to zero and the ratio multiplier coefficient 296 to a unity value. In a more aggressive approach, however, a virtual buffer 290 can be determined as the accumulated capacity of the texture buffer 292 and the shader buffer portion 294. Each of these two approaches can be modified by a ratio multiplier coefficient 296 such as a 1.1 value which would provide a virtual buffer 290 having ten percent more capacity than the combined capacities of the texture buffer 292 and the shader buffer portion 294.

Figure 9:
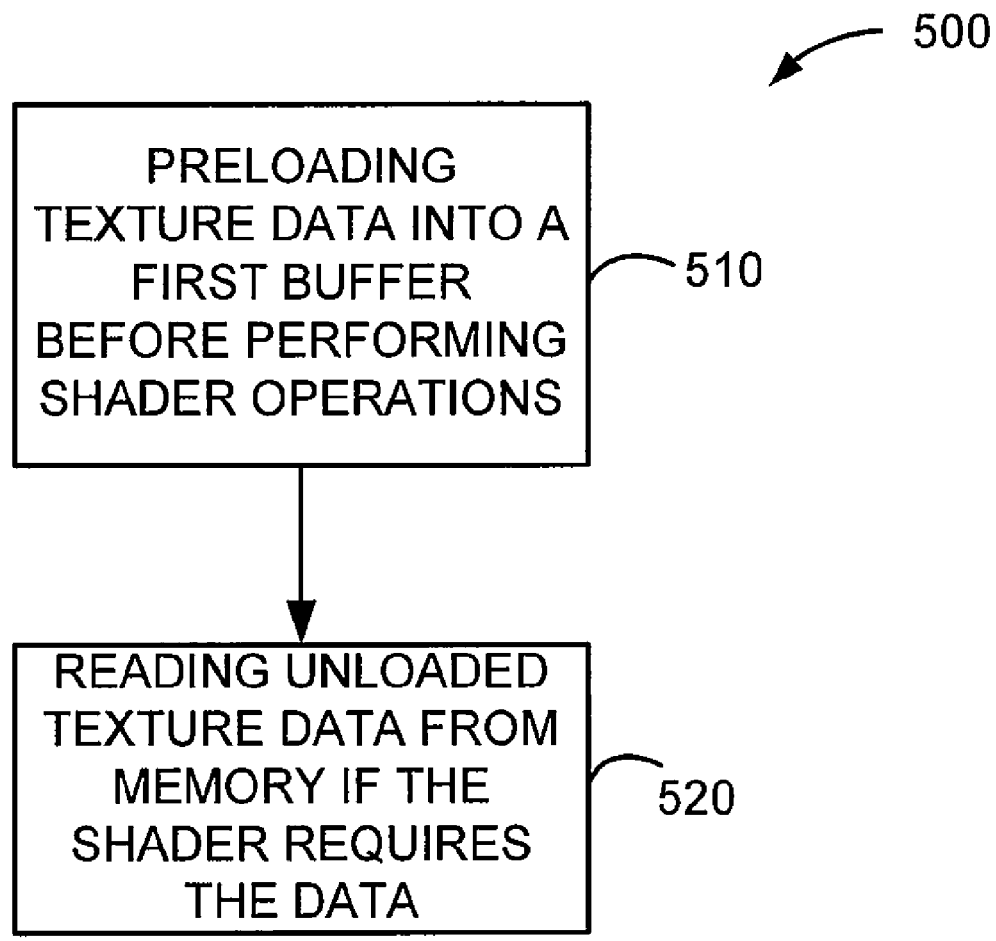
FIG. 9 is a block diagram illustrating an embodiment of a method of managing texture data.

Reference is now made to FIG. 9, which is a block diagram illustrating an embodiment of a method of managing texture data. The method 500, as illustrated in block 510, begins with preloading texture data into a first buffer before performing shader operations. In this manner, the texture data is processed and made available to a shader for subsequent processing based on the predicted requirements of the shader in future operations. By preloading the texture data, latency associated with fetching required data from memory is eliminated and performance is thus improved. The method also includes, in block 520, reading unloaded texture data from memory if the shader requires the data for ongoing operations. This operation may be utilized while the shader is processing the particular graphics element. In some circumstances the shader is performing a dependent read seeking additional data before a particular shader operation can be completed. For this reason, shader processing that utilizes a dependent read necessarily requires a greater number of clock cycles than a similar shader process that utilizes preloaded data.

Figure 10:
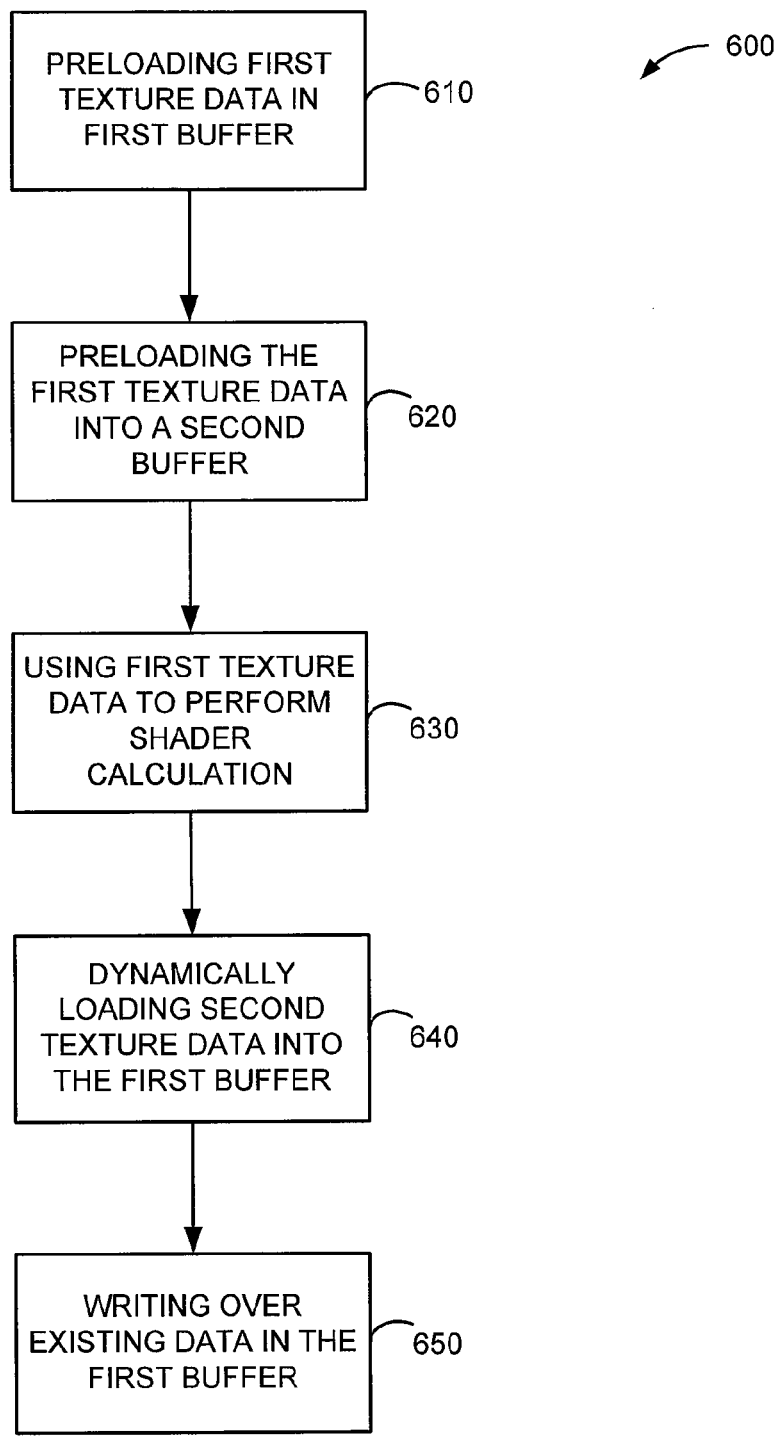
FIG. 10 is a block diagram illustrating an alternative embodiment of a method of managing texture data.

Reference is now made to FIG. 10, which is a block diagram illustrating an alternative embodiment of a method of managing texture data. The method 600 includes preloading first texture data from system memory in a first buffer in block 610. The method 600 also includes preloading the first texture data into a second buffer in block 620. The preloaded texture data corresponds to graphics elements that have not been processed in the first logic block. In block 630, the first texture data is used to perform a shader calculation. When utilizing the preloaded texture data, the shader calculation is performed without suffering the latency associated with retrieving data from a memory location. The method 600 also includes dynamically loading second texture data into the first buffer in block 640. Dynamic loading occurs when the first logic block requires texture data that is not stored in the first or second buffer. The second texture data is generated by processing a dependent read request for texture service. The result of the processed dependent read request is written into the first buffer. When the first buffer lacks the capacity to receive the second texture data, existing data in the first buffer is written to a second buffer in block 650.

Figure 11:
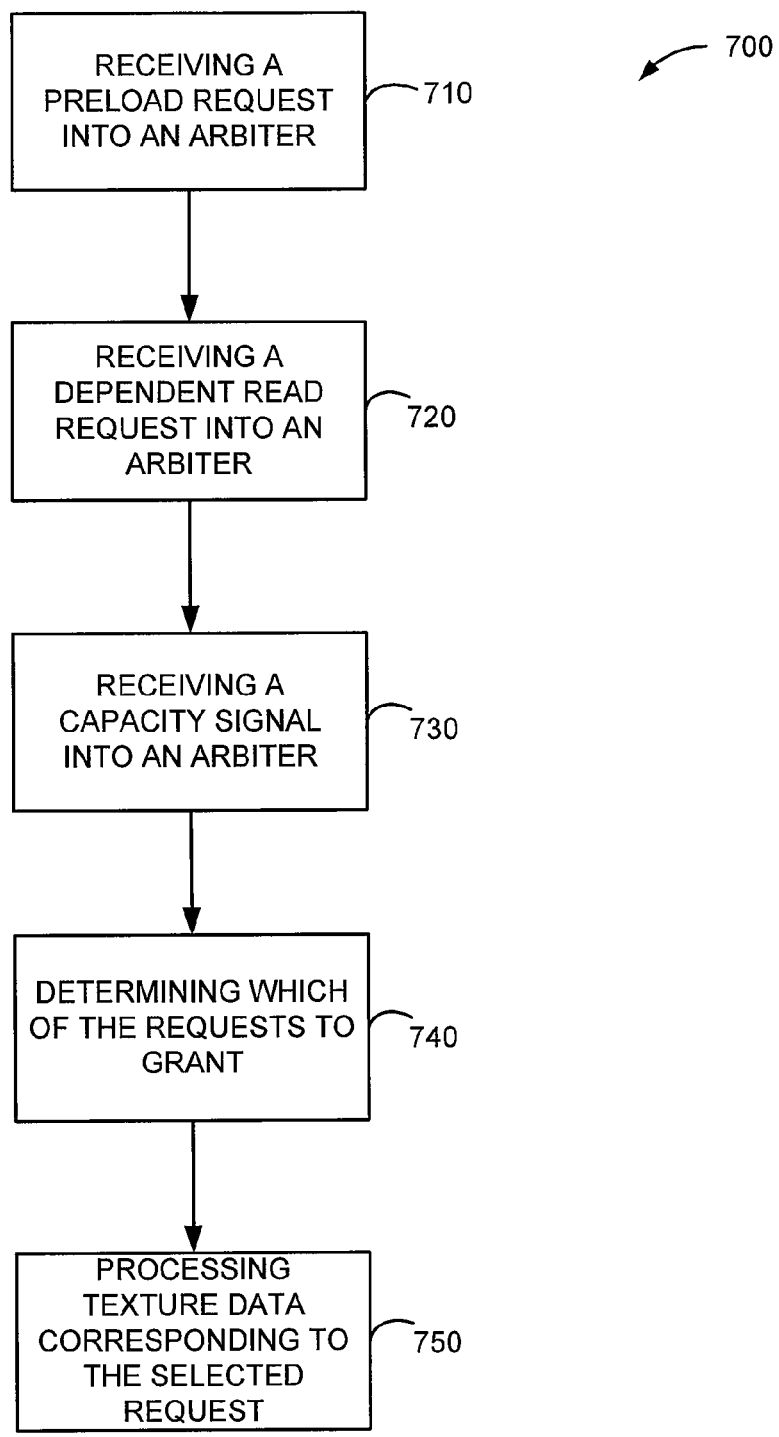
FIG. 11 a block diagram illustrating another alternative embodiment of a method of managing texture data.

Reference is now made to FIG. 11, which is a block diagram illustrating another alternative embodiment of a method of managing texture data. The method 700 includes receiving a preload request into an arbiter in block 710. The preload request is configured to request the processing of texture data in advance of shader processing for a specific graphics element. Examples of graphics elements include pixels, vertexes, and geometries used in graphics rendering. The method 700 includes receiving a dependent read request into an arbiter in block 720. The dependent read request is configured to request the processing of texture data after shader processing where the request is generated by the shader based on a subsequent texture service requirement. The method 700 also includes receiving a capacity signal into an arbiter in block 730. The capacity signal can be generated by the texture buffer and can indicate the actual capacity of the texture buffer or the capacity of a virtual buffer. A virtual buffer in this context can be assigned buffer capacity based on some function of the texture buffer. The virtual buffer can also include the accumulation of a texture buffer capacity and a shader buffer capacity, or some portion thereof.

The method 700 also includes determining which of the requests to grant in block 740. This determination may be made by the arbiter utilizing, for example, the capacity signal. Depending on the value of the capacity signal, a selected request corresponding to either the preload request or the dependent read request is granted. In details, if the value of the capacity is 1 (or others) that means the virtual buffer has available capacity, then the selected request comprises the preload request; if the value of the capacity is not 1 that means the virtual buffer doesn't have available capacity, then the selected request comprises the dependent read request. The arbiter for texture service plays a key role in balancing requests for the dependent read and the preload. For example, if the preload request is scheduled too frequently, the shader will not be able to allocate enough resources to generate new threads. Alternatively, if the dependent read request is scheduled too frequently, then not enough new threads are pipelined and the shader performance will be compromised due to the latency of retrieving texture descriptors from system memory.

The virtual buffer can be used as a parameter for the driver to adjust the texture buffer from an actual size to a larger-than-actual size depending on different shader programs. In this manner, the texture pipeline may grant more preload requests to the extent such that the virtual buffer has the capacity to accommodate the additional data. The arbiter can also check the shader scheduler in advance to see if there is texture buffer space in the shader internal buffer that can be allocated or reserved. The allocated space can also be added to the actual texture buffer size for more preload requests scheduling. While the preload requests are granted based on the availability of the texture buffer, the dependent read request is scheduled with high priority since each request may be reserving significant shader internal resources. Thus, the trigger to switch from granting dependent read requests to preload requests can be the level of the virtual buffer or the texture buffer.

To provide additional system flexibility, this level may be adjusted based on the shader program. For example, if the preload of a pixel shader and the dependent read of a vertex shader coexist, then the trigger level should be set to a relatively high value to allow the pixel shader to finish quickly. Additionally, since the release of the texture buffer depends on the data format, the format information is also provided in the feedback information to the arbiter. The method also includes processing texture data corresponding to the selected request in block 750. The texture request data will be processed through the texture cache control and the texture filter unit and result in a texel color. A preload texel color may be stored in the texel buffer waiting for the shader to grant the new thread. In contrast, a dependent read texel color may be forwarded directly to the shader since this data has been specifically requested by the shader.

Embodiments of the present disclosure can be implemented in hardware, software, firmware, or a combination thereof. Some embodiments can be implemented in software or firmware that is stored in a memory and that is executed by a suitable instruction execution system. If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

At least the following is claimed:

1. A method for managing texture data in computer, comprising:
    receiving, into an arbiter, a preload request configured to request processing of texture data in advance of shader processing;
    receiving, into the arbiter, a dependent read request configured to request processing of texture data after shader processing;
    receiving, into the arbiter, a capacity signal from a texture buffer;
    determining, utilizing the capacity signal, a selected request corresponding which of the preload request and the dependent read request is granted;
    processing, in a texture processor, texture data corresponding to the selected request.

2. The method of claim 1, further comprising sending processed preload data from the texture processing block to the texture buffer.

3. The method of claim 1, further comprising sending processed dependent read data to a shader processing block.

4. The method of claim 1, wherein the capacity signal is generated by the texture and indicated the capacity of the texture buffer or the virtual buffer.

5. The method of claim 4, wherein the selected request comprises the preload request if the virtual buffer has available capacity.

6. The method of claim 4, wherein the selected request comprises the dependent read request if the virtual buffer does not have available capacity.

7. The method of claim 4, further comprising a plurality of shader processing block types, wherein the virtual buffer is further configured corresponding to which of the plurality of shader processing block types is utilized.

8. The method of claim 7, wherein the plurality of shader processing block types is selected from the group consisting of: a pixel shader, a vertex shader, and a geometry shader.

9. A system for managing texture data in computer, comprising:
    a texture processor configured to process texture data in a graphics pipeline;

a shader processing block configured to perform a shader operation on a graphics element in the graphics pipeline;

an arbiter configured to select between a plurality of requests for service of the texture processor; and a texture buffer configured to receive processed texture data from the texture processor;

wherein the plurality of requests comprise:

a preload request configured to request texture processing service from the texture processor on texture data before the shader program operation is performed; and a dependent read request configured to request texture processing service from the texture processor on texture data while the shader program operation is being performed.

10. The system of claim 9, further comprising a shader buffer configured to receive data for the shader operation.

11. The system of claim 10, wherein the shader buffer comprises a texture portion configured to receive processed texture data corresponding to a dependent read request.

12. The system of claim 9, wherein the arbiter is configured to select based on a capacity signal which is determined by the capacity of a virtual buffer received from the texture buffer.

13. The system of claim 12, wherein if the capacity signal indicates a less than full capacity virtual buffer then the preload request is granted by the arbiter.

14. The system of claim 13, wherein if the capacity signal indicates a full capacity virtual buffer then the read dependent request is granted by the arbiter.

15. The system of claim 9 wherein the arbiter comprises a counter configured to track capacity in the texture buffer.

16. The system of claim 15, wherein the counter decrements an amount corresponding to the size of processed texture data being written to the texture buffer.

17. The system of claim 15, wherein the counter increments an amount corresponding to the size of processed texture data consumed from the texture buffer.

18. A system for managing texture data in computer, comprising:

an arbiter configured to select between a dependent read request and a preload request for services of a texture processor;

a texture buffer configured to receive processed texture data corresponding to the preload request; and a virtual buffer, sized as a function of the texture buffer configured to send a capacity signal to the arbiter as an input.

19. The system of claim 18, wherein the texture processor performs texture related calculations.

* * * * *